United States Patent [19]

Beno et al.

[11] Patent Number: 5,999,868
[45] Date of Patent: Dec. 7, 1999

[54] CONSTANT FORCE SUSPENSION, NEAR CONSTANT FORCE SUSPENSION, AND ASSOCIATED CONTROL ALGORITHMS

[75] Inventors: Joseph H. Beno; Damon A. Weeks; William F. Weldon, all of Austin; Don A. Bresie, Round Rock; Andreas M. Guenin, Austin, all of Tex.

[73] Assignee: Board of Regents The University of Texas System, Austin, Tex.

[21] Appl. No.: 08/805,602

[22] Filed: Feb. 26, 1997

Related U.S. Application Data

[60] Provisional application No. 60/012,248, Feb. 26, 1996.

[51] Int. Cl.$^6$ .................................................. B60G 17/015
[52] U.S. Cl. .......................... 701/37; 280/5.5; 280/5.514; 280/6.157
[58] Field of Search ................................... 701/36, 37, 38; 280/5.5, 5.507, 5.513, 5.514, 5.515, 6.157, 6.158

[56] References Cited

U.S. PATENT DOCUMENTS

| | | |
|---|---|---|
| 3,374,055 | 3/1968 | Donlon et al. |
| 4,513,833 | 4/1985 | Sheldon ................................ 180/9.1 |
| 4,712,807 | 12/1987 | Kurosawa ............................. 280/707 |
| 4,804,203 | 2/1989 | Glab et al. ............................ 280/707 |
| 4,825,370 | 4/1989 | Kurosawa ......................... 364/424.05 |
| 4,838,574 | 6/1989 | Baraszu ................................ 280/707 |
| 4,909,535 | 3/1990 | Clark et al. .......................... 280/5.515 |
| 4,924,393 | 5/1990 | Kurosawa ......................... 364/424.05 |
| 4,969,622 | 11/1990 | Stuart .................................. 280/707 |
| 4,980,830 | 12/1990 | Aoki et al. ......................... 264/424.05 |
| 5,054,593 | 10/1991 | Carlson ............................... 192/21.5 |
| 5,062,657 | 11/1991 | Majeed ................................ 280/707 |
| 5,062,658 | 11/1991 | Majeed ................................ 280/707 |
| 5,071,157 | 12/1991 | Majeed ................................ 280/707 |
| 5,097,916 | 3/1992 | Brandstadter ........................ 180/9.1 |
| 5,178,405 | 1/1993 | Brandstadter ........................ 280/705 |
| 5,235,529 | 8/1993 | Hanson et al. ....................... 364/572 |
| 5,255,191 | 10/1993 | Fulks .................................... 364/424 |
| 5,267,466 | 12/1993 | Morris ................................... 73/1 J |
| 5,289,379 | 2/1994 | Williams ........................... 364/424.05 |
| 5,324,065 | 6/1994 | Derrien et al. ...................... 280/705 |
| 5,393,087 | 2/1995 | Taniguchi et al. .................. 280/707 |
| 5,398,785 | 3/1995 | Leitmann et al. ................... 188/267 |
| 5,432,700 | 7/1995 | Hrovat et al. .................... 364/424.05 |
| 5,475,593 | 12/1995 | Townend .............................. 701/38 |
| 5,519,612 | 5/1996 | Liubakka et al. ................ 364/424.05 |

OTHER PUBLICATIONS

Aoyama et al., "Development of the Full Active Suspension by Nissan," *Electronic and Non–Electronic Suspension Systems and Steering Controls*, (901747) SP–838, Society of Automotive Engineers, Inc., pp. 77–85, Sep. 1990.

Barak, "Magic Numbers in Design of Suspensions for Passenger Cars," *Car Suspension Systems and Vehicle Dynamics*, (911921) SP–878, Society of Automotive Engineers, Inc., pp. 53–88, Sep. 1991.

Crolla and Abdel–Hady, "Semi–Active Suspension Control for a Full Vehicle Model," *Car Suspension Systems and Vehicle Dynamics*, (911904) SP–878, Society of Automotive Engineers, Inc., pp. 45–51, Sep. 1991.

Dohi and Maruyama, "Ride Comfort Optimization for Commercial Trucks," *Total Vehicle Ride, Handling and Advanced Suspensions*, (902283) SP–843, Society of Automotive Engineers, Inc., pp. 75–81, Oct. 1990.

(List continued on next page.)

*Primary Examiner*—William A. Cuchlinski, Jr.
*Assistant Examiner*—Edward Pipala
*Attorney, Agent, or Firm*—Arnold, White & Durkee

[57] ABSTRACT

The method and apparatus of the present invention provide constant force suspension and near constant force Suspension and associated control algorithms, all of which may be utilized in vehicle suspension systems. By using the apparatus of the present invention, a vehicle may be isolated from the motion of a wheel as it follows rough terrain, thereby improving ride quality.

28 Claims, 5 Drawing Sheets

OTHER PUBLICATIONS

Dunwoody, "Digital Acitve Suspension," *Car Suspension Systems and Vehicle Dynamics*, (911903) SP–878, Society of Automotive Engineers, Inc., pp. 33–43, Sep. 1991.

ElMadany and Dokainish, "An Assessment of Ride Quality of Heavy–Duty Trucks," *Current Trends in Truck Suspensions*, (801418) SP–475, Society of Automotive Engineers, Inc., pp. 45–56, Nov. 1980.

Esmailzadeh and Bateni, "Optimal Acitve Vehicle Suspensions with Full State Feedback Control," *Suspensions and Their Relationship to Vehicle Roll Stability*, (922473) SP–940, Society of Automotive Engineers, Inc., pp. 41–52, Nov. 1992.

Hoogterp et al., "Semiactive Suspension for Military Vehicles," *SAE Technical Paper Series* (930847), Society of Automotive Engineers, Inc., Mar. 1993.

Inagaki et al., "Development of Feedforward Control Algorithms for Active Suspension," *Car Suspension Systems and Vehicle Dynamics*, (920270) SP–917, Society of Automotive Engineers, Inc., pp. 31–40, Feb. 1992.

Ivers and Miller, "Experimental Comparison of Passive, Semi–Active On/Off, and Semi–Active Continuous Suspensions," *Advanced Truck Suspensions*, (892484) SP–802, Society of Automotive Engineers, Inc., pp. 1–7, Nov. 1989.

Jolly and Miller, "The Control of Semi–Active Dampers Using Relative Feedback Signals," *Advanced Truck Suspensions*, (892484) SP–802, Society of Automotive Engineers, Inc., pp. 9–17, Nov. 1989.

Kiriczi and Kashani, "Control of Active Suspension with Parameter Uncertainty and Non–White Road Unevenness Disturbance Input," *Total Vehicle Ride, Handling and Advanced Suspensions*, (902283) SP–843, Society of Automotive Engineers, Inc., pp. 75–81, Oct. 1990.

Kojima et al., "Development of New Toyota Electronic Modulated Suspension—Two Concepts for Semi–Active Suspension Control," *Car Suspension Systems and Vehicle Dynamics*, (911900) SP–878, Society of Automotive Engineers, Inc., pp. 1–14, Sep. 1991.

Miller and Nobles, "Methods for Eliminating Jerk and Noise in Semi–Active Suspensions," *Total Vehicle Ride, Handling and Advanced Suspensions*, (902284) SP–843, Automotive Engineers, Inc., pp. 83–91, Oct. 1990.

Miller and Nobles, "Design and Development of a Semi––Active Suspension for a Military Tank," (881133) SP–917, Society of Automotive Engineers, Inc., pp. 1–9, 1988.

Nagiri et al., "Improvement of Ride Comfort by Preview Vehicle–Suspension system," *Automotive Suspensions and Steering Systems*, (920277) SP–917, Society of Automotive Engineers, Inc., pp. 81–87, Feb. 1992.

Pinkos et al., "An Actively Damped Passenger Car Suspension System with Low Voltage Electro–Rheological Magnetic Fluid," *Vehicle Suspension and Steering Systems*, (930268) SP–952, Society of Automotive Engineers, Inc., pp. 87–93, Mar. 1993.

Queslati and Sankar, "Performance of a Fail–Safe Active Suspension with Limited State Feedback for Improved Ride Quality and Reduced Pavement Loading in Heavy Vehicles," *Suspensions and Their Relationship to Vehicle Roll Stability*, (922474) SP–940, Society of Automotive Engineers, Inc., pp. 53–62, Nov. 1992.

Temple and Hoogterp, "Semiactive Suspension: A Mobility Enhancement for Combat Vehicles," *European Conference on Off–Road Vehicles, The International Society for Terrain Vehicle System*, London, Jun. 1992.

CONSTANT FORCE SUSPENSION, NEAR CONSTANT FORCE SUSPENSION, AND ASSOCIATED CONTROL ALGORITHMS

This invention claims the benefit of U.S. Provisional Application Ser. No. 60/012,243, by Joseph H. Beno et al., filed Feb. 26, 1996.

The United States government may have specific rights in this invention pursuant No. DAE07-93-C-R094 awarded by the U.S. Army TACOM.

FIELD OF THE INVENTION

The invention relates generally to the field of vibration isolation systems and more specifically to the field of active suspension systems for vehicles.

BACKGROUND OF THE INVENTION

Active and semi-active vehicular suspension systems have received considerable attention in the past several years as an improvement and replacement to traditional passive systems (Miller and Nobles, 1988; Ivers and Miller, 1989; Jolly and Miller, 1989; Aoyama et al., 1990; Kiriczi and Kashani, 1990; Miller and Nobles, 1990; Kojima et al., 1991; Dunwoody, 1991; Crolla and Abdel-Hady, 1991; Inagaki et al., 1992; Nagiri et al., 1992; Esmailzadeh and Bateni, 1992; Queslati and Sankar, 1992; Pinkos et al., 1993; Hoogterp et al., 1993; Temple and Hoogterp, 1992). Traditional passive systems generally are composed of springs, dampers (shock absorbers), and various structural linkages, such as wishbones or A-arms. A single wheel station, typically representing 1 quarter of a 4-wheel vehicle, has a simplified mechanical representation as shown in FIG. 1, in which the compliance of the tire has been ignored.

In such a traditional passive system, the spring 5 imparts an oscillatory force to the sprung mass 10 (with smooth changes in acceleration and velocity) in response to any motion of wheel 15 (gradual or impulsive). The amplitude of the motion of the mass 10 depends upon the frequency and magnitude of the wheel motion. The effect of the damper 20 is to absorb and dissipate the energy imparted to the system from wheel motions relative to the sprung mass 10.

There are several drawbacks to a traditional passive system. First, the spring-damper system cannot eliminate the transmission of ground irregularities to the sprung mass 10. Second, for much of the frequency range of interest, ground disturbances are magnified by the suspension system, resulting in large spring mass disturbances. Further, choosing spring and damper constants for optimum low frequency ride quality results in poorer high frequency ride quality. Additionally, choosing the best compromise set of constants for vehicle ride quality results in reduced vehicle maneuverability (i.e., poor vehicle handling).

The contradictory choices for passive suspension components lead to the concept of adaptive passive suspension components, usually referred to as semi-active suspension systems. The improvements offered by various semi-active systems have ranged from fair to good. The degree of ride improvement, without simultaneous handling degradation, has been dependent on the responsiveness of the component's adaptability, as well as the control scheme in use. In particular, adaptable dampers, often switching between only 2 states (a high and low damping rate), have achieved some success. In all cases, however, passive components, even if they are adaptive, will still transmit road displacements to the sprung mass. For rough cross-country terrain or road, or for very high performance vehicles, the results are less than satisfactory (Miller and Nobles, 1988; Ivers and Miller, 1989; Miller and Nobles, 1990; Kojima et al., 1991; Pinkos et al., 1993; Hoogterp et al., 1993; Temple and Hoogterp, 1992).

Fully active systems that involve active (bi-directional) force generating components (contrasted with springs, for example, that passively generate restoring forces in response to mechanical displacement), which may be used in conjunction with passive elements, have received far less attention and met with more limited success. This is especially true with respect to suspensions for off-road, rough terrain. The major consideration for on-road, wheeled vehicles is vehicle control over improved surfaces with limited terrain variations. For improved vehicle control over smooth improved surfaces, primary considerations are maintaining constant ground pressure and reducing vehicle roll during turns; passenger acceleration loading is important, but secondary. Consequently, most active suspension control approaches involve measuring forces (such as with a load cell) between the vehicle body and the vehicle suspension attachment points and frequently implicitly assume limited road fluctuations. The major limitation in cross country mobility over rough unimproved, off-road terrain is sprung mass and passenger acceleration loading. Consequently, improving cross-country mobility benefits most from dynamic control of force on the sprung mass, necessitating a somewhat different set of priorities, and assumptions of limited terrain fluctuations are not valid.

Specifically, active suspension success has been limited primarily by the control scheme for the force-generating components, often requiring input of information that is difficult, inconvenient, or costly to obtain. All active and semi-active systems involve a sensing and feedback loop, with various control schemes. Harmonic content of the wheel motion, natural frequencies of the suspension components, speed of calculations, responsiveness of the suspension components, the timeliness of information, and the duration of collecting terrain information before responding, have proven to be critical issues in the quality of results. Typically, for example, assumptions concerning limited road fluctuations are made or information about the terrain in front of the vehicle is needed. Development of such "look-ahead" systems has proven difficult and associated component costs and sizes are prohibitive. Fully active systems without look-ahead capabilities have proven little better (or even worse) than semi-active systems. (Aoyama, 1990; Kiriczi and Kashani, 1990; Dunwoody, 1991; Crolla and Abdel-Hady, 1991; Inagaki et al., 1992; Nagiri et al., 1992; Esmailzadeh and Bateni, 1992).

SUMMARY OF THE INVENTION

The present invention provides methods and apparatus for creating Constant Force and Near Constant Force suspension systems (CFS and NCFS) and methods which allow for simplified control strategies for these systems. An exemplary embodiment of the concept may use a force or torque actuator (preferably electromechanical) to replace the springs and dampers of prior art suspension systems. This actuator is used to isolate a vehicle body attached to the actuator from surface irregularities encountered during travel. The methods of the present invention involve control of the actuator such that it exerts a constant force on the vehicle body. Therefore, the vehicle body does not vertically move and remains unaffected by the wheel's motion. In addition to the actuator, the CFS and NCFS systems may be supplemented by mechanical passive springs to reduce energy consumption. In exemplary embodiments these springs may be air springs, for example, multi-stage air springs. When supplemental mechanical springs are used, it is recognized that the springs apply a variable vertical force on the vehicle body as they are extended or compressed; this invention includes the concept of varying the actuator force output to cancel the spring force fluctuations in order to maintain a constant vertical force on the vehicle body.

Additionally, the present invention involves the use of electromechanical actuators, capable of forward and reverse operation, to inject or extract energy to/from an active suspension; and the use of electromechanical actuators, capable of forward and reverse operation, operating in motoring, braking, generation, and regeneration modes, (to recover energy from moving sprung and unsprung masses). In exemplary embodiments, the actuators may be linear or rotary.

The present invention discloses a constant force or near constant force suspension system comprising a vehicle body, a vehicle wheel, an actuator connected between vehicle wheel and vehicle body to isolate the vehicle body from surface irregularities by maintaining a substantially constant force on the vehicle body in response to control signals, means for determining and tracking a fictitious reference point (representing a desired vertical position of the vehicle body), first sensing means (which may be one or more accelerometers) for measuring actual vertical position of the vehicle body, and a control system for developing the control signals, which are dependent upon the fictitious reference point and the actual vertical position. The present invention also contemplates a system in which a plurality of vehicle wheels are supplemented with the above elements. In an exemplary embodiment, the control system may comprise a PID controller for developing control signals based upon a difference between the fictitious reference point and the actual vertical position.

The present invention may also include at least one spring connected between the vehicle wheel and the vehicle body to support a static weight of the vehicle body, and a second sensing means for determining relative displacement between the vehicle wheel and the vehicle body. The present invention may also include means for adjusting said fictitious reference point if a window of acceptable suspension travel having a predetermined upper threshold and lower threshold has been exceeded by an output of the second sensing means. If the spring is a pneumatic spring, the present invention may include a third sensing means for determining air pressure of the pneumatic spring.

In an exemplary embodiment, the control signals may be developed in response to superposition of a plurality of forces, such as a force proportional to a displacement between the vehicle body and the fictitious reference point, a force proportional to a relative velocity of the vehicle body and the vehicle wheel, a force proportional to an absolute velocity of the vehicle body, a force proportional to a relative displacement of vehicle body from vehicle wheel, a force proportional to vehicle pitch, a force proportional to vehicle pitch rate, a force proportional to vehicle roll, and a force proportional to vehicle roll rate, wherein each of the forces comprises a proportionality constant having a negative, zero, or positive value.

In an exemplary embodiment, outputs from the one or more accelerometers may be integrated to yield actual vertical position of the vehicle body. The outputs may also be processed to determine pitch, roll, and vertical displacement of the vehicle body. Additionally data from the one or more accelerometers may be filtered to correct for accelerometer drift.

The present invention also discloses a method for determining vertical position of a vehicle in motion having a near constant force suspension system, comprising obtaining vertical position data from at least one accelerometer, obtaining drift data of at least one accelerometer by spectrum analysis, and determining vertical position from vertical position data and drift data.

The present invention also discloses a method for determining an updated vertical position of a vehicle in motion having a near constant force suspension system, comprising predicting anticipated vertical position data from measured road arm angular displacement, angular velocity, angular acceleration and measured characteristics of an actuator, obtaining measured vertical position data from at least one accelerometer, obtaining drift data of at least one accelerometer, determining a calculated vertical position from measured vertical position data and drift data, and comparing anticipated vertical position data to calculated vertical position data to identify errors in anticipated vertical position data, thereby developing an updated vertical position of the vehicle. In exemplary embodiments, the measured characteristics may be actuator voltage and current or actuator torque.

The present invention further discloses a method for providing constant force or near constant force suspension of a vehicle having a vehicle body and a vehicle wheel and at least one actuator connected between vehicle body and vehicle wheel and at least one spring connected between vehicle body and vehicle wheel, comprising determining relative displacement between vehicle body and vehicle wheel, computing an exerted force placed upon vehicle body by at least one spring, determining a supporting force required to support a static weight of vehicle body, determining a difference between the exerted force and the supporting force, determining an actuator force to be applied by the actuator to cancel the difference, thereby maintaining a substantially constant vertical force on the vehicle body. In exemplary embodiments, the method may further comprise determining a second actuator force (proportional to relative displacement) applied by the actuator, thereby simulating a spring having a natural frequency approximately between 0.1 Hz and 0.7 Hz.

The present invention also discloses a method for providing constant force or near constant force suspension of a vehicle having a vehicle body and a vehicle wheel and at least one actuator connected between vehicle body and vehicle wheel, comprising tracking a fictitious reference point, determining displacement of the vehicle body relative to the fictitious reference point, and calculating a modulated torque of at least one actuator necessary to move the vehicle body to be coincident to the fictitious reference point.

This invention provides methods to control the CFS and NCFS suspension systems that are particularly well suited for rough off-road conditions, but are also very effective for on-road conditions. These methods may include determining the vehicle reference height or vehicle desired vertical position. The present invention does not require direct sensing of forces exerted on a vehicle body at suspension attachment points, although this information may be used to supplement the control methods disclosed herein. The vehicle reference height may be determined by a method including a windowing technique that predicts upcoming terrain trends based on the current terrain profile. This technique continuously monitors suspension travel. Additionally, reference height may also be determined or aided by driver input, or vehicle vertical position above the ground (ride height) may be accomplished by properly balancing the forces exerted on the vehicle body from the actuator and the previously mentioned passive mechanical springs, so as to effect a weak restoring force (which softly keeps the suspension movement roughly centered in its range of travel).

When using the control methods that involve tracking a reference position, both the reference position and the vehicle's vertical position is required as well. The present invention contemplates several techniques to determine these positions. First, a combination of data from an accelerometer and data from a spectrum analysis and filtering to eliminate the effects of accelerometer drift may be combined to determine accurate vehicle vertical position. Second, vehicle vertical position may be computed based on measured characteristics, including, for example, measured road arm angular displacement, angular velocity, angular acceleration, and either measured actuator voltage and current, or measured actuated torque, using known models that represent suspension response based on these measurements.

DETAILED DESCRIPTION

A. Suspension Approach

The present invention provides a new approach to active suspension systems, referred to as a Constant Force Suspension and a Near Constant Force Suspension, that allows simplified control strategies. Further, the present invention provides for control strategies for this suspension system that bypass most of the difficulties associated with the prior art approaches, and provides good performance for both on-road and rough terrain off-road vehicle applications, enabling smooth rides over rough terrain without the requirement to look-ahead. The concepts were developed in the context of a fully active suspension system, however, it may be possible to use the present invention control techniques with a semi-active system. In one embodiment of the present invention, an electromagnetic actuator, or a pneumatic, hydraulic or other actuator, may be used to replace or supplement torsion or linear spring and rotary or linear damper suspension components. The present invention may be used with light and heavy vehicles, wheeled or track vehicles, and for both on and off-road applications. It is to be understood that the present invention may also be used with factory equipment, mining equipment, and the like. The experimental computational results, plots, and comparisons with conventional systems discussed below are expressed with respect to an M1 tank system. It is emphasized, however, that the applications of these concepts are not limited to the M1 tank application or geometry, or to the use of electromechanical actuators, and are generally applicable to most vehicular suspension applications. These concepts may also be applied to other suspension and vibration isolation systems.

The present invention disregards any reference to traditional springs and dampers; disregards any attempts to actively adjust these components for improved ride qualities; and disregards any attempts to simulate spring-damper action. Instead, the present invention focuses on what is needed to isolate a vehicle body (or mass) from the motions of a wheel as it follows rough terrain. Isolation of a vehicle from surface irregularities is conceptually simple: if the suspension components attached to a vehicle body (which will be referred to as a "sprung" mass, despite the possible absence of springs) exert constant forces on the attachment points, regardless of the wheel motion, the vehicle body will not move and will remain unaffected by the wheel's up and down motion. This approach to active suspension is referred to as a "Constant Force Suspension," (CFS) and may be difficult to achieve, in practice.

Figure 3:
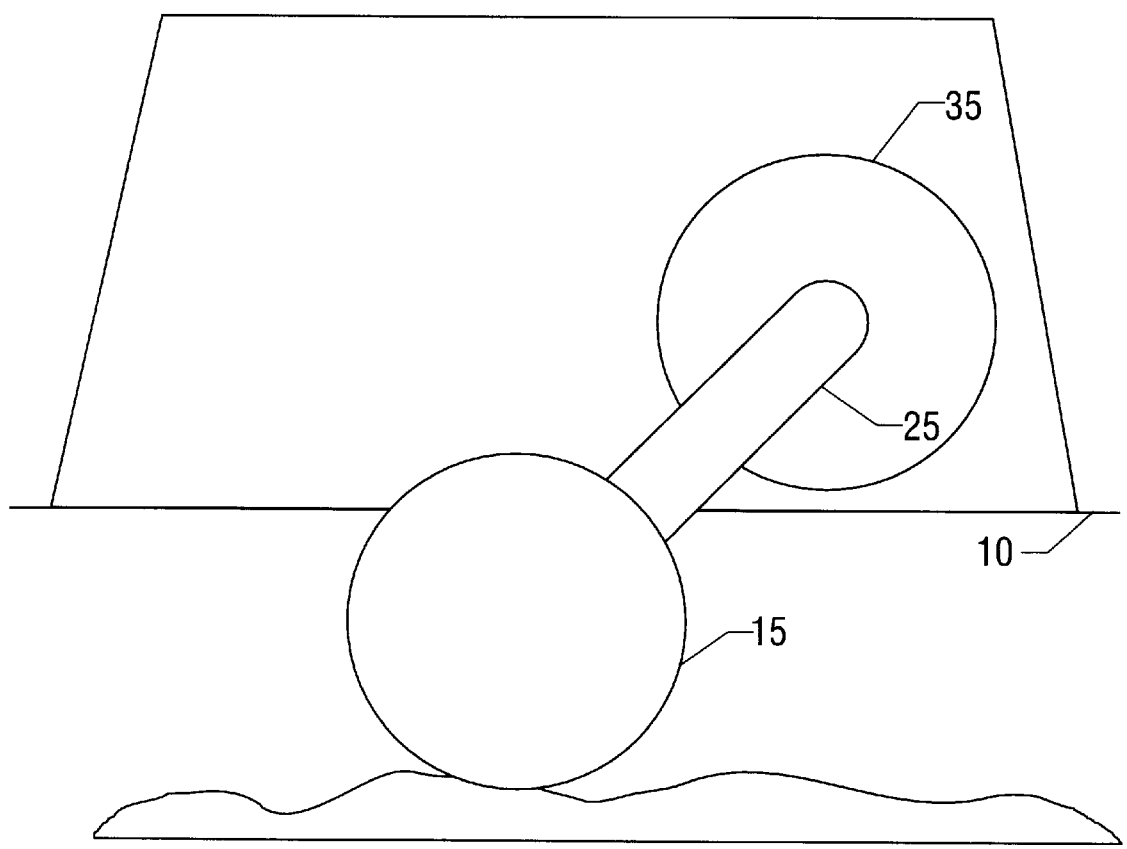
FIG. 3 is a simplified block diagram of a suspension system according to the present invention as configured to replace a tracked vehicle suspension.

This isolation of the vehicle body cannot be accomplished with real or simulated spring-damper systems (due to their very nature they exert non-constant forces, as a function of displacement and/or velocity), except in the non-physical limit of an infinitely long spring. It may be accomplished, however, with controlled force producing actuators (hydraulic or electric) serving as the interface between the vehicle body and the wheels as shown in FIG. 3. FIG. 3 shows a suspension system according to the present invention, as it would be configured for a typical tracked vehicle (with a trailing arm suspension configuration). The system includes a road arm 25 attached from a road wheel 15 to an actuator 35, which may be, for example, an electromagnetic actuator.

The motion of interest for a vehicle suspension system is the linear, vertical component of the wheel motion. This implies that a linear actuator, linking the hub of the wheel with an attachment point on the vehicle body, generating a constant force on the attachment point regardless of the vehicle motion, is preferable for a CFS. Such a linear actuator can be difficult to design and incorporate into a vehicle—especially for off-road vehicles that require a large suspension stroke, or travel. It is sometimes easier to incorporate a rotary actuator, especially if it is electromechanical. Due to this requirement to convert rotary force components (torque) to linear motion, such a rotary device will not maintain a truly constant vertical force on the suspension attachment point. Additionally, if a linear actuator embodiment is used, linkages, supplemental springs, road surface irregularities and actuator irregularities will also likely result in a failure to maintain a true constant vertical force. Consequently, it is most probable that attempts to preprogram an actuator to produce constant vertical force on the sprung mass as a function of the position and speed of suspension components will in reality, only produce an approximation of the correct constant force (i.e., an imperfect CFS)

Figure 1:
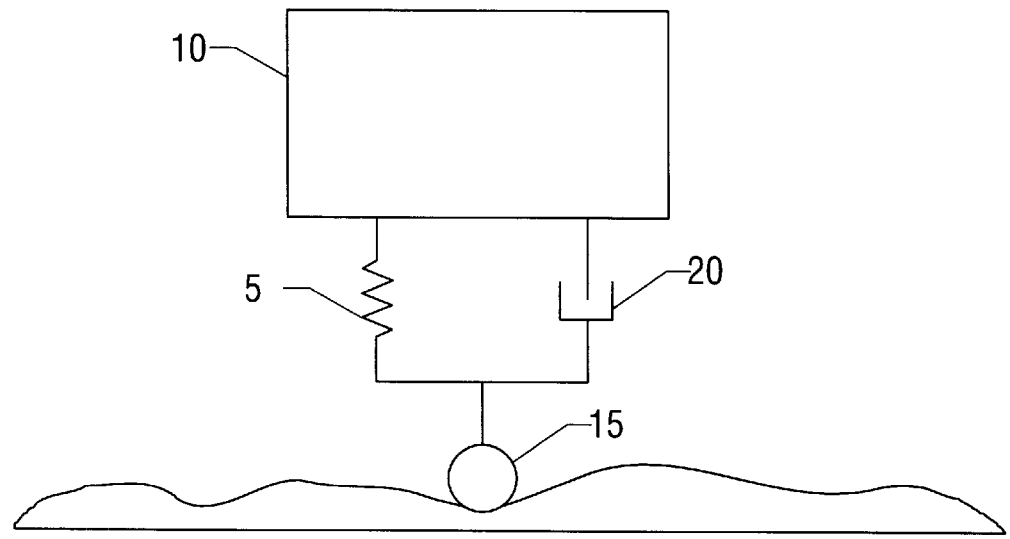
FIG. 1 is a simplified block diagram of a mechanical model of one road wheel station.
Figure 2:
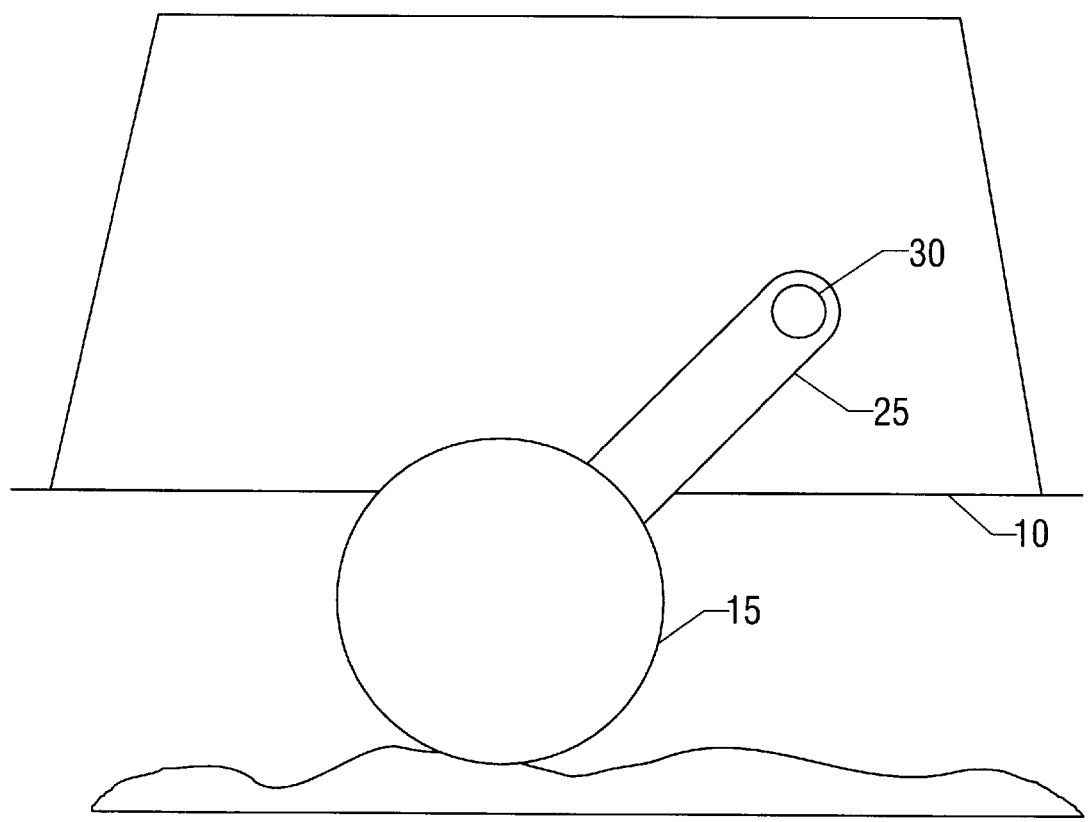
FIG. 2 is a simplified block diagram of a tracked vehicle suspension system known in the prior art.

FIG. 2 shows a simplified block diagram of an M1 trailing arm suspension system. This prior art system includes a mass 10, a road wheel 15, trailing arm 25, and a torsion bar 30. Modeling of this suspension system, and other wheeled and tracked vehicle configurations, however, have shown that the variations in forces transmitted to the body may be relatively small, typically 5–15% of the force required to support the vehicle static weight. This allows supplementing the imperfect CFS with simplified feedback and correction schemes to convert the constant torque system to a close approximation of a constant force system, which is referred to in the present invention as a "Near Constant Force Suspension," (NCFS) or substantially constant force system. As used herein, the term "substantially constant force" means a force that remains constant or nearly constant.

One significant aspect of the NCFS is that the motion imparted to the sprung mass due to the imperfect initial approximation to a CFS system is small and slowly varying (low frequency)—actually more of a slow drift. This slow drift may be on the order of approximately 0.2 to 1.0 Hz. Such a slow drifting motion is easy to correct using standard Proportional-Integral-Differential (PID) control concepts; is amenable to low frequency, slower corrective action than for other active suspension concepts; and does not display instability problems. Although NCFS and CFS algorithms apply to linear force and rotary torque actuators, rotary actuators are more commonly available and can be applied either at a suspension pivot point, or can be combined with a rack and pinion, screw drive, ball screw, or the like, to produce linear motion. Actuators may be connected between vehicle body and vehicle wheel using appropriate mechanical brackets, linkages and traditional suspension geometries. Suspension geometries for many vehicular applications, if not most, can be adapted to accommodate CFS and NCFS concepts. These suspension Geometries may include for example, dual A-arm, trailing arm, road arms, and the like.

In exemplary embodiments, both CFS and NCFS systems may be supplemented by mechanical passive springs, typically at each wheel, to reduce energy consumption. Typically, it is desired that the mechanical springs be very soft, such that the system natural frequency is under approximately 1 Hz. In exemplary embodiments, the natural frequency may be between approximately 0.1 Hz to 0.7 Hz. Such springs thereby generate a force that is more nearly linear, but compressed enough to support the vehicle's weight while stationary or traversing smooth terrain. In all exemplary embodiment, the springs may support the static weight of the vehicle body to thereby reduce force and power requirements from the actuators.

A constant or near constant force suspension system may be accomplished by sensing the relative displacement between the vehicle wheels and body; computing the forces exerted on the vehicle body by the passive supplemental springs; subtracting the force required to support the vehicle static weight, and determining an actuator force that will cancel the remaining spring force, thereby maintaining a substantially constant vertical force on the vehicle body. If the supplemental springs are air springs, output of pressure sensors on the air springs may be used to compute the force exerted by the springs, which is then canceled by the force actuator output. All of the control schemes described below work equally well with such a hybrid system and automatically also serve to help offset the spring's adverse effects on vehicle ride and control (as described above).

An exemplary embodiment of the spring concept may involve variable rate or a multi-stage air spring. Air springs allow very soft springs in a small space. A two-stage air spring, for example, uses an auxiliary chamber that may be included or excluded from the main chamber, through the use of a valve. The use of one or more auxiliary chambers creates multiple choices for air spring pressure. Alternately, the variable rate spring may be obtained through standard pneumatic system components to adjust air spring pressure This allows the selection of a softer spring (which includes both the primary and the supplemental chambers) or a stiffer spring (using just the primary chamber) as needed to meet additional effective loads, which is particularly useful in accomplishing roll control during turning maneuvers without requiring excessive additional force (or torque) capacity from the suspension actuators.

Results of computer modeling of an electromechanical active suspension system for an M1 tank indicate that use of a two-stage air spring allows the vehicle to accomplish the full range of turning maneuvers with a minimally sized torque actuator—only slightly larger than that required for straight ahead driving. It is envisioned that use of more than one auxiliary chamber to produce a spring with more than two stages is also possible, although, two stages are sufficient. All other methods of varying a volume size in such a manner as to accomplish gas pressure variations, such as those commonly used in pneumatic systems, may also be applied to accomplish the effects of the multi-stage air spring described above.

B. Details of Control Approaches

With the NCFS, torque variations may be required (through a controlled feedback loop) to overcome the drifting motion described previously. Control through this feedback loop is far more simple and less time sensitive than the control required to achieve a fully active suspension system based on spring-damper models for the suspension components. Numerical experiments using a model of an NCFS, indicate that delays of approximately 50 milliseconds between the time when drifting (i.e., body motion) is first sensed until the time when corrective action is initiated, can be easily tolerated. Delays of approximately 75 milliseconds can be tolerated, but significant performance degradation results. Since actuator electronic controllers operate with control cycle times of approximately 2–10 milliseconds, these delays represent approximately 5–25 cycle times.

Figure 7:
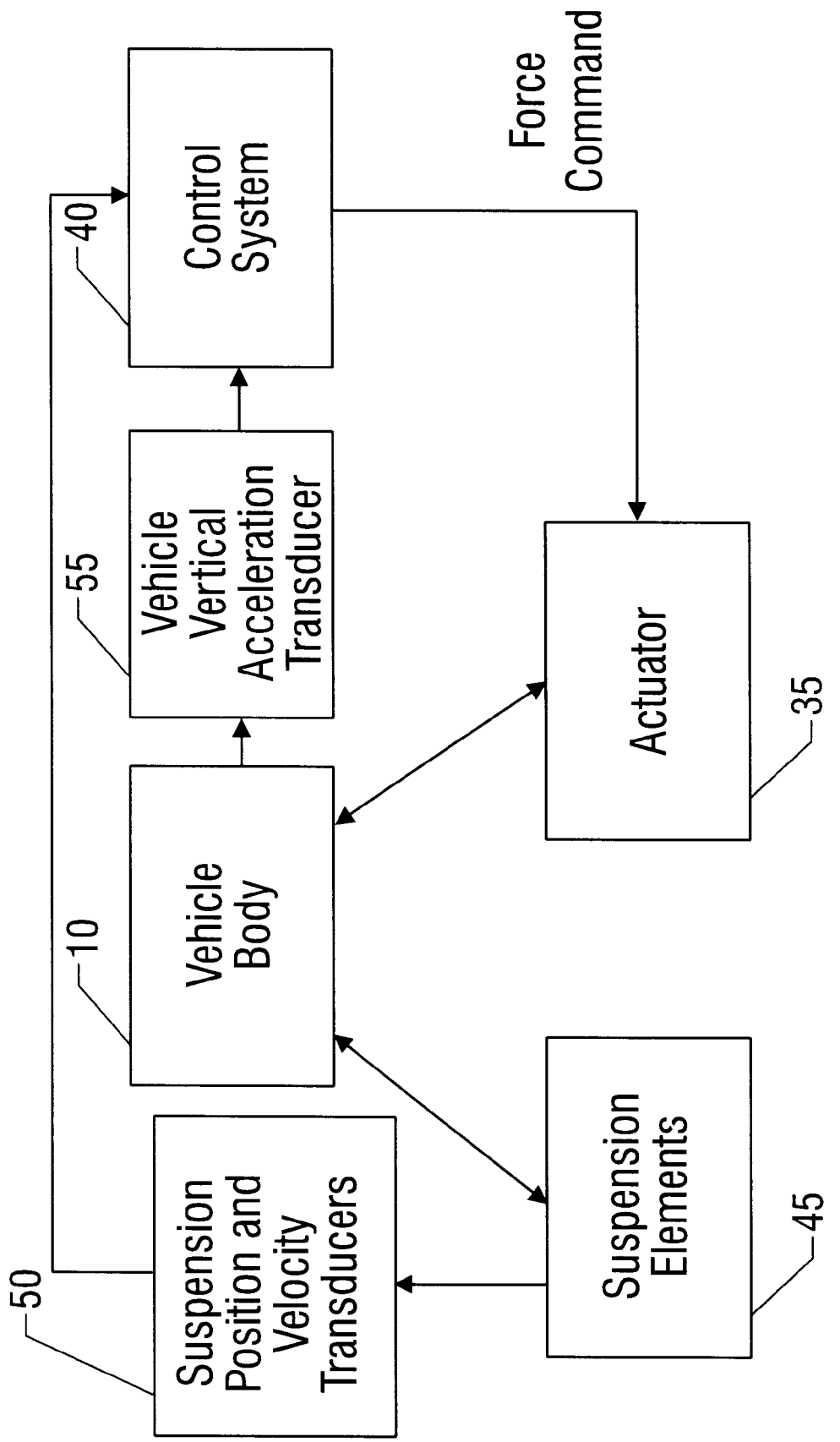
FIG. 7 is a block diagram of an exemplary embodiment of the present invention.

A simplified block diagram of an exemplary embodiment of the present invention is shown in FIG. 7. FIG. 7 shows a vehicle body 10, to which is attached actuator 35 and suspension elements 45. These elements are connected between the vehicle body 10 and vehicle wheels (not shown in FIG. 7) and provide isolation of the vehicle body 10 from ground irregularities. Sensing of the suspension elements occurs in sensor 50, which may be, for example, suspension position and velocity transducers. Sensing of the vehicle body vertical position occurs in sensor 55, which may be, for example, a vehicle vertical acceleration transducer. The outputs of these sensors are forwarded to control system 40, which develops control signals in response thereto. These control signals are output from control system 40 and are used to provide force commands to actuator 35.

One embodiment of the CFS and NCFS concepts first involves the tracking of a fictitious reference point. The tracking may be performed within a control system, such as a standard microprocessor controller. The fictitious reference point may be stored within memory of the microprocessor controller. The fictitious reference point represents the desired vertical position of the vehicle body. The height of the reference point may be adjusted in such a manner as to distinguish between bumps (which require no reference point adjustment) and hills (which require up or down adjustment of the reference point). Then, vehicle body actual displacement relative to this fictitious reference point may be used to determine modulated actuator torque, supplemental to the constant torque described above, that is required to bring the vehicle body position in coincidence with the fictitious reference point. The reference point and the vehicle height are known when the vehicle is stationary and may be determined at that time from the angle of the road arm in a trailing arm suspension. Methods for determining appropriate values for these two heights (actual vehicle and fictitious reference position) while a vehicle is in motion are discussed below.

The target reference height may be determined within the controller's processor memory by a method comprising a "windowing" technique that predicts upcoming terrain trends based on the current terrain profile. In this technique, suspension travel is continuously monitored (through a sensor that measures road arm angular displacement, for example). If, at any instant, an upper or lower threshold of travel is exceeded, then the reference point is adjusted upward or downward at a specified rate for a specified short time period. The adjustment of reference position will cause control signals based on the variation between the fictitious reference point and the vertical position to be sent to the actuators. This time period may be between approximately 1 and 20 control cycle times, and more preferably between 3 and 5 cycle times. The upper and lower thresholds establish a window of acceptable suspension travel that has no effect on the position of the reference point. The window thresholds and the rate of change for the reference position are adjustable to optimize rides for various terrain. These window thresholds may be between approximately 50% and 95% of suspension allowable travel, and more preferably be between approximately 80% and 90%. It is possible to develop schemes for automatic adjustment of these parameters, in response to observed frequency and displacement of suspension components.

With this windowing technique, several factors insure stability in control of the vertical position of the reference point: (1) the reference position remains unchanged (and stable) unless triggered by the suspension travel exceeding an upper or lower bound, (2) when a change in reference position is initiated, the amount of change is limited by the specified rate of change and the duration of this rate of change, (3) modeling has shown that, while undergoing a change of reference point position, the rates of change and the duration of change for the reference point position need not be large, (4) transition from a stationary condition to a moving condition for the reference point, and back to a stationary state, is gradual and smooth (if done properly), and (5) multiple, nested, windows can be used to initiate faster changes in reference position to be triggered by more severe excursions of suspension travel—modeling has shown big improvements in using two nested windows and far less improvement, even some disadvantage in using three or more windows. In the limit of an infinite number of infinitesimal windows, the response of springs may be simulated.

The windowing technique is anticipatory. Excess suspension travel triggers a small adjustment in the reference position on the assumption that the large suspension travel is the precursor of a hill (as opposed to a bump that may be accommodated by the suspension). If the small change in reference position is insufficient, another change will be triggered shortly, typically after a few controller cycle times. Similarly, if rapid terrain fluctuations result in the initiation of a reference position displacement in the wrong direction, it will be quickly corrected. Since suspension systems are designed with sufficient travel to accommodate anticipated terrain conditions (dependent on vehicle mission), the windowing technique is effective, as has been shown by modeling results.

Finally, when using the windowing technique for CFS and NCFS systems, it is not necessary to use a force sensor between the suspension attachment points and the vehicle body. Suspension actuators may be first controlled to generate an approximate upward force on the vehicle body. Vertical drift due to this approximate constant force results in triggering a movement of the fictitious reference point. This movement may be achieved through the windowing technique and standard PID control to develop a revised reference position corrected for drift. Identically, large terrain fluctuations, such as hills or ramps, result in triggering a movement of the fictitious reference point through the windowing technique and standard PID control to develop a revised reference position, causing vertical motion of the vehicle body to track the hill or ramp. Accelerometers on the vehicle body may be used in a feedback control loop (using the accelerometer reading) to cause the vehicle body to follow a prescribed acceleration trace, thereby achieving the desired body motion.

In addition to automated windowing techniques to determine reference height, driver input may also be used to adjust the reference height. An example of an embodiment of this concept would involve the vehicle steering wheel being attached to a column that the driver pulls back to raise the reference height and pushes forward to lower the reference height, for example. However, another driver-controlled mechanism, such as levers, knobs, or the like may be used. Such a system may be very similar to an aircraft (control) system which allow the driver (pilot) to steer and maintain vehicle (aircraft) height above the ground with one control mechanism. Windowing information may produce visual or auditory cues to assist the driver in the driver instrument panel or projected on the vehicle windshield to display the center of average suspension travel with respect to suspension travel limits.

In addition to reference position, updated information concerning actual vehicle vertical position is required. Vehicle position or height may be determined from the road arm angle, which may be averaged over all wheels while the vehicle is stationary. While moving, there are at least two potential sources for updating this information based on standard techniques. One source may be an accelerometer, with the output provided to the suspension control system to be integrated to yield position. In exemplary embodiment, multiple accelerometers on a vehicle may be used to determine pitch, roll, and vertical displacement. Accelerometers provide present time information only, updated at a high rate. With modem micro-sensors, accelerometers are quite inexpensive and have already found utility in vehicle systems (airbags, for example). Higher quality accelerometers (including the integrated processing), with very low drift rates, are more expensive. Nevertheless, accelerometer drift will be present, and it is desired to be corrected.

One method for correcting the accelerometer drift is through the use of a high-pass digital filter, which eliminates the low-frequency, drift terms, but imparts a phase lag on the result. To counteract the phase lag, a low-pass filter can be used. This, method has proven to be particularly useful in determining a drift-free velocity signal from an accelerometer output. For on and off-road vehicles, the cut-off frequencies for both the low and high pass filters are typically between 0.5 and 1.0 Hz. This filtering may be accomplished within the suspension system control processor, may be accomplished through an analog circuit on the accelerometer's analog output, or may be accomplished through a digital processor on the accelerometer output prior to sending the information to the suspension control system processor.

The second standard technique to determine vehicle height is to) use spectral analysis methods on road arm angular displacement (which may be easily sensed) to filter high frequency information (bumps) and extract low frequency information (hills). The sensors and processors for this technique are inexpensive (e.g., standard digital signal processing chips and accelerometers) and require no development. However, there are shortcomings in this approach. The most accurate results are obtained for a particular instant when data is collected over a time interval that contains the instant of interest as the midpoint of the interval. In other words, accurate frequency analysis information for time "t" requires the use of data over the time period from "t−Dt" to t+Dt," where larger Dt results in improved accuracy. This introduces a delay that cannot be avoided between real time and the time (in the recent past) for which good information is available. Modeling results on the M1 suspension system have shown that standard spectral analyses and filtering techniques, by themselves, do not yield sufficiently accurate results while still operating within acceptable delay times.

To overcome the shortcomings associated with the two standard techniques discussed above, two novel special purpose techniques may be used that exploit the features of the NCFS. One special purpose technique is a combination of accelerometer data and spectrum analysis data. The accelerometer data is used to keep track of vehicle actual vertical position (stored within the suspension control system memory). The filtered spectrum results are used to identify accelerometer drift. Since short term accelerometer drift is minor, slightly delayed identification of this drift will not result in significant vertical displacement of the vehicle sprung mass prior to initiation of corrective action (accomplished through control signals sent to the actuators). Consequently the quality of the accelerometer will be determined by the suspension stroke—suspensions with short strokes may be able to accommodate limited vertical drift displacement prior to requiring corrective action. For most vehicular suspensions, this will present little problem.

The second special purpose technique identified for use with the NCFS is to computationally predict (within the suspension control system processor) vehicle vertical displacement based on measured road arm annular displacement, angular velocity, angular acceleration, and either measured actuator voltage and current (which allows computation of torque) or measured actuator torque (using components that are imbedded into the actuator design). This computed vehicle vertical displacement may then be compared with the filtered results (provided to the suspension control system from vehicle body mounted accelerometers) from frequency spectrum analysis to identify errors. Assuming adequate accuracy in the computations (which may be refined and verified in experimental programs), errors will be small enough that delayed identification (resulting from spectrum analysis delays) will not result in significant vehicle vertical motions prior to correction.

As with the windowing technique discussed above, success of the two special purpose techniques identified for tracking actual vehicle vertical height depend on certain features that are inherent in the basic NCFS approach: (1) Suspension systems are designed with sufficient travel to accommodate anticipated terrain conditions (dependent on vehicle mission), (2) The constant torque concept, by itself, produces a near level ride and only slowly drifting motion (much slower than the vertical motion of the road wheels) of the vehicle body needs to be corrected, (3) Delays of up to approximately 50 milliseconds in responding to the slow drifting terms have been demonstrated in modeling to have little adverse effect on ride quality of the vehicle and delays of approximately 75 milliseconds can be accommodated, (4) Assuming reasonable accuracy in determining vehicle vertical position using the accelerometer or computational prediction methods, the errors discovered by the spectrum analysis method, even with its associated delays, will be minor and delayed correction will not present a problem.

Another approach to NCFS that does not require knowledge of vehicle body absolute position, is to properly balance the forces exerted on the vehicle body from the actuator and the previously mentioned passive mechanical springs so as to effect a weak restoring force (which softly keeps the suspension movement roughly centered in its range of travel). In this approach, an additional actuator force term is calculated, and superimposed on the force resulting from the spring cancellation control algorithm (described previously). This additional actuator force is computed to be proportional to the relative displacement between the vehicle and wheels, with a weak proportionally constant, so as to create the effect of a soft spring. This approach is equivalent to only partially canceling the effects of the passive spring, effectively making a very weak passive spring. This will keep the suspension within its intended range of travel and, by adjusting degree of spring cancellation, it is possible to soften or stiffen the suspension response to accommodate very rough terrain, as appropriate. This approach allows the vehicle to automatically track large, low frequency, terrain fluctuations (e.g., hills) while still providing a very minimal suspension response to small, high frequency terrain fluctuations (e.g., small bumps)

While cancellation of the force fluctuations inherent with the supplemental passive spring has already been described, cancellation of damping that is inherent with moving suspension components (such as from friction) is also a desirable feature to include in the NCFS control algorithm. Damping based on relative motion between the sprung and unsprung masses creates a varying force on the sprung mass. Consequently, to more closely approximate a CFS system (which improves NCFS performance) it is desirable to measure the relative velocity between the sprung and unsprung masses and apply an appropriate assisting force to offset the resistive, velocity dependent forces that are inherent in suspension mechanisms. The result is to create the effect of a nearly zero friction system.

Finally, CFS and NCFS approaches are compatible with producing damping of the sprung mass motion based on absolute sprung mass vertical motion (so called "sky hook damping"), which is vastly superior to accomplishing damping based on relative velocities between the sprung and unsprung masses (which is accomplished by the common shock absorber). To accomplish this damping requires knowledge of sprung mass velocity with respect to a fixed reference point (e.g., the center of the earth) and all the methods described above to determine the sprung mass absolute position are applicable. In an exemplary embodiment, the combination of a digital low-pass and high-pass filter on the accelerometer output, as described above may be effective. The sprung mass absolute velocity is then multiplied by a damping constant to produce a velocity dependent damping force that is then appropriately applied by the actuator. This damping force is added to the forces applied to the other computed actuator forces (e.g., those necessary to approximately cancel the supplemental passive spring force fluctuations and to correct for minor sprung motion drifts).

Figure 4:
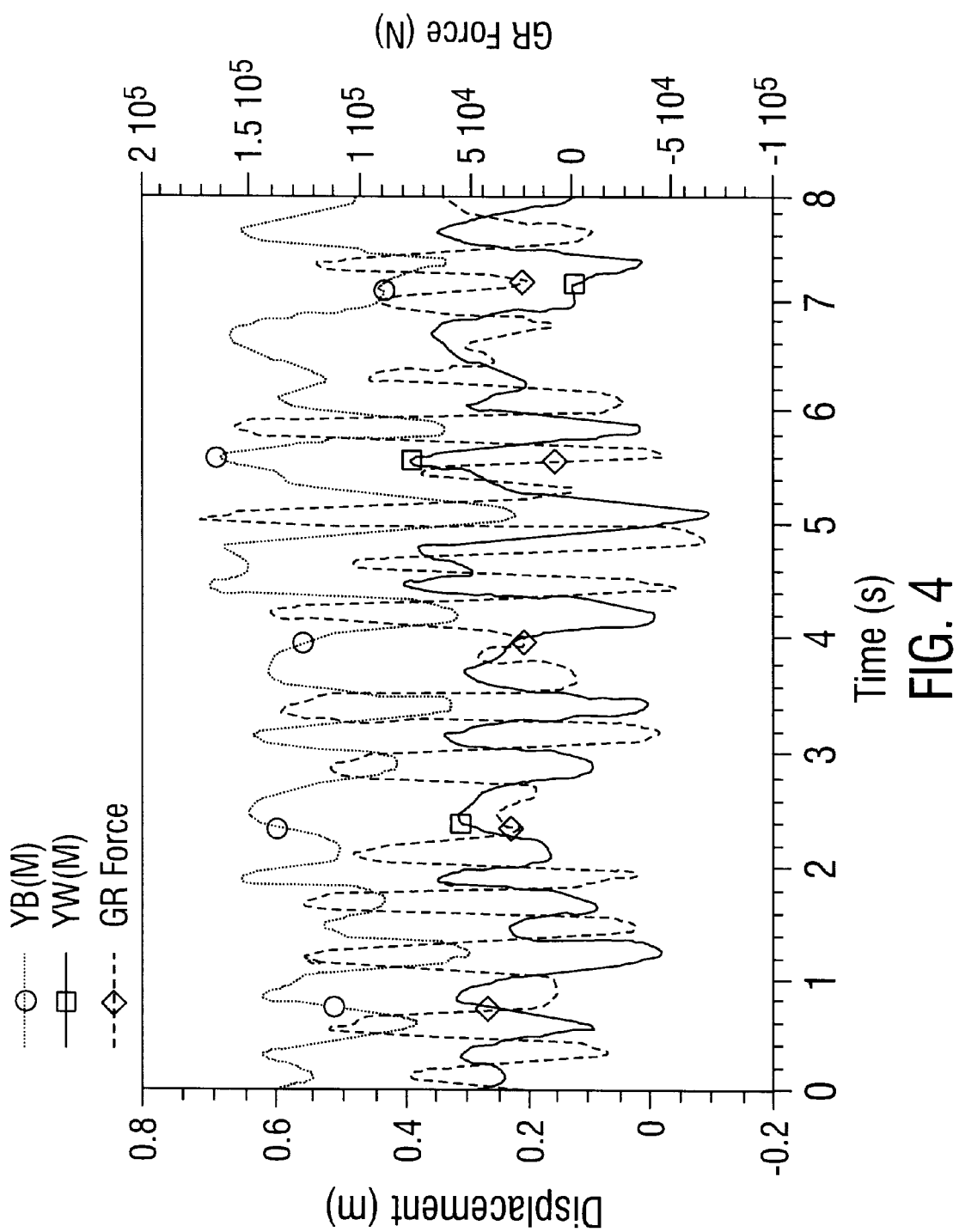
FIG. 4 is a graphical representation of the results of computational programs used to model a suspension system of the M1 tank according to the prior art.

FIG. 4 shows the results of a computational program used to model the NCFS designed for the M1 tank. Specifically, FIG. 4 shows the calculated performance of the current M1 tank passive torsion bar suspension system, as is known in the prior art and is currently in use, over a very challenging terrain. The tank is traversing the terrain at 30 mph. YW is the path followed by the road wheel as it tracks the terrain, with vertical displacement in meters. YB is the path followed by the tank body, which is seen to closely mimic YW. The right axis indicates ground force, which frequently goes negatively (indicating lift-off). At this rate of travel on this terrain, the tank crew is exposed to accelerations that exceed human tolerance for sustained exposure. Additionally, the operation of equipment and fire control systems is not possible. The U.S. Army Tank and Automotive Command indicates that actual M1 top speed on this terrain limited by sustained human acceleration limits, is approximately 12 mph.

Figure 5:
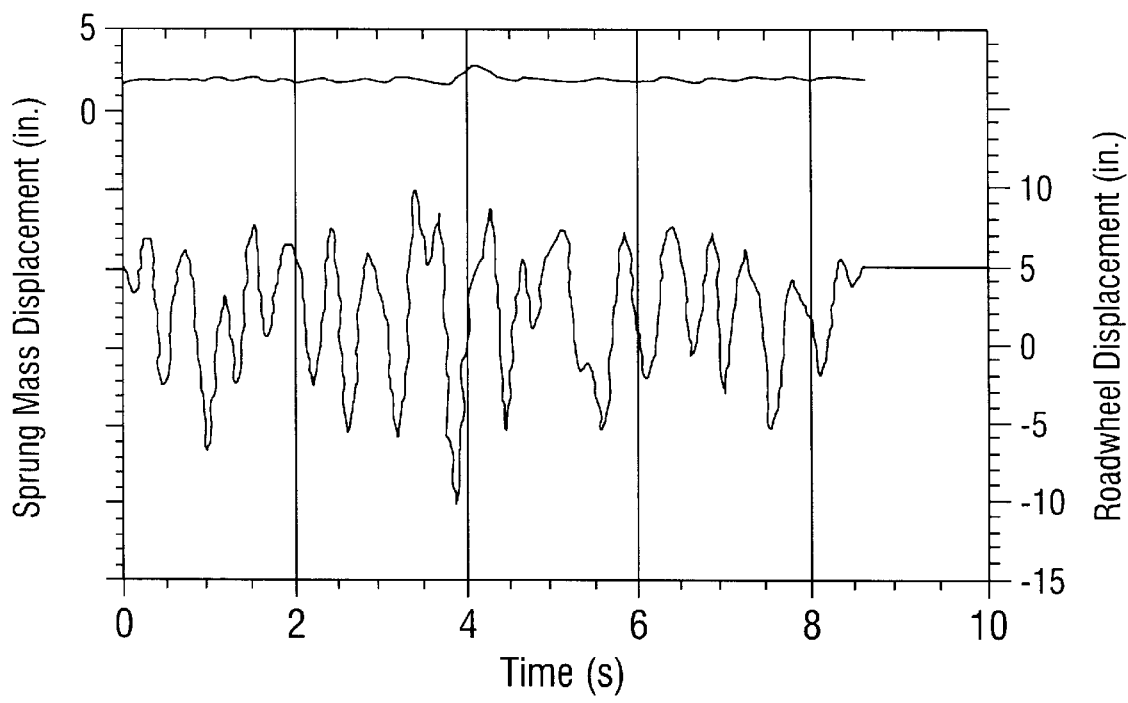
FIG. 5 is a graphical representation of the results of computational programs used to model the NCFS according to the present invention designed for the M1 tank.

FIG. 5 shows the simulated performance of the NCFS system as applied to a sprung mass of approximately 5 tons (i.e., an M1 tank). In FIG. 5, the tank is traversing the terrain at 40 mph. Sprung mass displacement (shown at the top of FIG. 5) and roadwheel displacement (shown at the bottom of FIG. 5) correspond to YW and YB of FIG. 4. The tank path is seen to be significantly smoothed by using the apparatus and methods of the present invention. Although ground force is not plotted, it does not come close to becoming negative. The tank crew, in this simulated case, is exposed to conditions well within human tolerance levels and would be able to operate all equipment, even sighting a fire control equipment.

Figure 6:
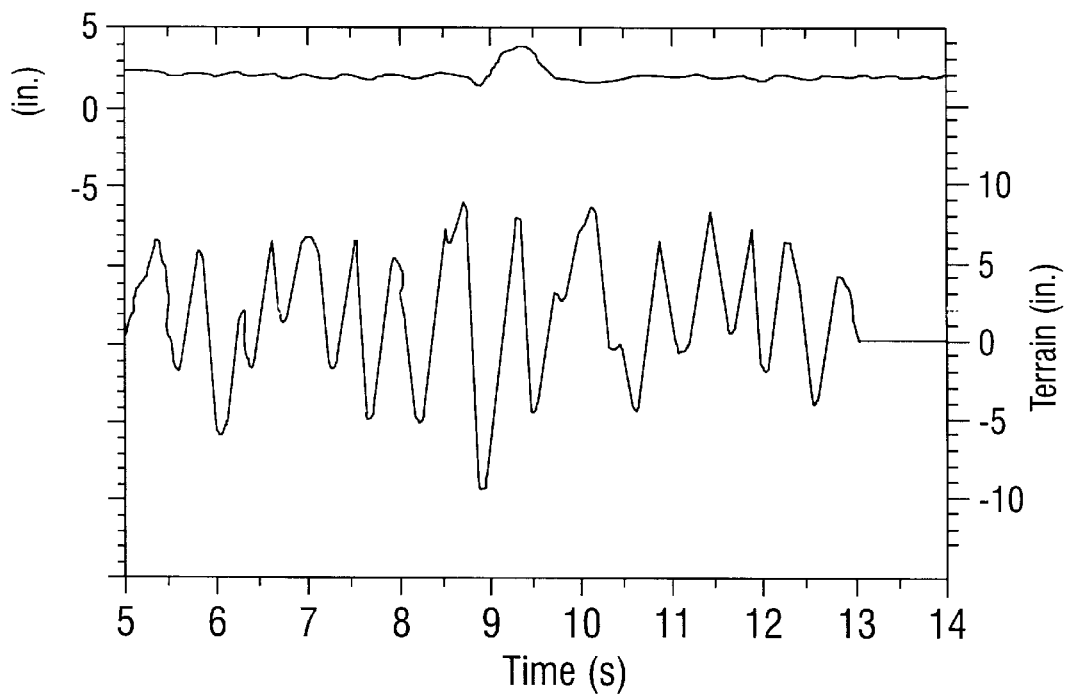
FIG. 6 is a graphical representation of data obtained from a single wheel station test rig using NCFS according to the present invention.

FIG. 6 shows test data obtained with a laboratory test rig, using the NCFS system. The laboratory test rig uses a 5 ton block of concrete to simulate the weight supported by one road-wheel of an M1 tank and uses a hydraulically operated vertical ram to provide vertical disturbances to simulate terrain fluctuations. The terrain disturbances simulated the same terrain shown in FIG. 4 and FIG. 5, at a vehicle speed of 40 mph. In this case, sprung mass motion is seen to agree with simulations and is also seen to be very small.

References

Aoyama et al., "Development of the Full Active Suspension by Nissan," *Electronic and Non-Electronic Suspension Systems and Steering Controls*, (901747) SP-838, Society of Automotive Engineers, Inc., p. 77–85, September 1990.

Barak, "Magic Numbers in Design of Suspensions for Passenger Cars," *Car Suspension Systems and Vehicle Dynamics*, (911921) SP-878, Society of Automotive Engineers, Inc., p. 53–88, September 1991.

Crolla and Abdel-Hady, "Semi-Active Suspension Control for a Full Vehicle Model," *Car Suspension Systems and Vehicle Dynamics*, (911904) SP-878, Society of Automotive Engineers, Inc., p. 45–51, September 1991.

Dohi and Maruyama, "Ride Comfort Optimization for Commercial Trucks," *Total Vehicle Ride, Handling and Advanced Suspensions*, (902283) SP-843, Society of Automotive Engineers, Inc., p. 75–81, October 1990.

Dunwoody, "Digital Active Suspension," *Car Suspension Systems and Vehicle Dynamics*, (911903) SP-878, Society of Automotive Engineers, Inc., P. 33–43, September 1991.

ElMadany and Dokainish, "An Assessment of Ride Quality of Heavy-Duty Trucks," *Current Trends in Truck Suspensions*, (801418) SP-475, Society of Automotive Engineers, Inc., p. 45–56, November 1980.

Esmailzadeh and Bateni, "Optimal Active Vehicle Suspensions with Full State Feedback Control," *Suspensions and Their Relationship to Vehicle Roll Stability*, (922473) SP-940, Society of Automotive Engineers, Inc., p. 41–52, November 1992.

Hoogterp et al., "Semiactive Suspension for Military Vehicles," *SAE Technical Paper Series* (930847), Society of Automotive Engineers, Inc., March 1993.

Inagaki et al., "Development of Feedforward Control Algorithms for Active Suspension," *Car Suspension systems and Vehicle Dynamics*, (920270) SP-917, Society of Automotive Engineers, Inc., p. 31–40, February 1992.

Ivers and Miller, "Experimental Comparison of Passive, Semi-Active On/Off, and Semi-Active Continuous Suspensions," *Advanced Truck Suspensions*, (892484) SP-802, Society of Automotive Engineers, Inc., p. 1–7, November 1989.

Jolly and Miller, "The Control of Semi-Active Dampers Using Relative Feedback Signals," *Advanced Truck Suspensions*, (892484) SP-802, Society of automotive Engineers, Inc., p. 9–17, November 1989.

Kiriczi and Kashani, "Control of Active Suspension with Parameter Uncertainty and Non-White Road Unevenness Disturbance Input," *Total Vehicle Ride, Handling and Advanced Suspensions*, (902283) SP-843, Society of Automotive Engineers, Inc., p. 75–81, October 1990.

Kojima et al., "Development of New Toyota Electronic Modulated Suspension—Two Concepts for Semi-Active Suspension Control," *Car Suspension Systems and Vehicle Dynamics*, (911900) SP-878, Society of Automotive Engineers, Inc., p. 1–14, September 1991.

Miller and Nobles, "Methods for Eliminating Jerk and Noise in Semi-Active Suspensions," *Total Vehicle Ride, Handling and Advanced Suspensions*, (902284) SP-843, Society of Automotive Engineers, Inc., p. 83–91, October 1990.

Miller and Nobles, "The Design and Development of a Semi-Active Suspension for a Military Tank," (881133) SP-917, Society of Automotive Engineers, Inc., p. 1–9, 1988.

Nagiri et al. "Improvement of Ride Comfort by Preview Vehicle-Suspension system." *Automotive Suspensions and Steering Systems*, 0(920277) SP-917, Society of Automotive Engineers, Inc., p. 81–87, February 1992.

Pinkos et al., "An Actively Damped Passenger Car Suspension System with Low Voltage Electro-Rheological Magnetic Fluid," *Vehicle Suspension and Steering Systems*, (930268) SP-952, Society of Automotive Engineers, Inc., p. 87–93, March 1993.

Queslati and Sankar, "Performance of a Fail-Safe Active Suspension with Limited State Feedback for Improved Ride Quality and Reduced Pavement Loading in Heavy Vehicles," *Suspensions and Their Relationship to Vehicle Roll Stability*, (922474) SP-940, Society of Automotive Engineers, Inc., p. 53–62, November 1992.

Temple and Hoogterp, "Semiactive Suspension: A Mobility Enhancement for Combat Vehicles," *European Conference on Off-Road Vehicles, The International Society for Terrain Vehicle Systems*, London, June 1992.

What is claimed:

1. A constant force or near constant force suspension system, comprising:
   a vehicle body;
   a vehicle wheel;
   an actuator connected between said vehicle wheel and said vehicle body to isolate said vehicle body from surface irregularities by maintaining a substantially constant force on said vehicle body in response to control signals;
   means for determining and tracking a fictitious reference point, said fictitious reference point representing a desired vertical position of said vehicle body, said fictitious reference point stored within a control system, said means coupled to said control system;

first sensing means for measuring actual vertical position of said vehicle body; and said control system for developing said control signals, said control signals dependent upon a relative comparison of said fictitious reference point to said actual vertical position, said control system coupled to said actuator.

2. A constant force or near constant force suspension system as claimed in claim 1, wherein said control system comprises a PID controller for developing said control signals based upon a difference between said fictitious reference point and said actual vertical position.

3. A constant force or near constant force suspension system as claimed in claim 1, further comprising at least one spring connected between said vehicle wheel and said vehicle body to support a static weight of said vehicle body.

4. A constant force or near constant force suspension system as claimed in claim 1, further comprising a second sensing means for determining relative displacement between said vehicle wheel and said vehicle body.

5. A constant force or near constant force suspension system as claimed in claim 4 further comprising means for adjusting said fictitious reference point if a window of acceptable suspension travel having a predetermined upper threshold and lower threshold has been exceeded by an output of said second sensing means.

6. A constant force or near constant force suspension system as claimed in claim 3 wherein said at least one spring comprises a mechanical or pneumatic spring.

7. A constant force or near constant force suspension system as claimed in claim 6, further comprising a third sensing means for determining air pressure of said pneumatic spring.

8. A constant force or near constant force suspension system as claimed in claim 6, further comprising a PID controller to correct drift of said vehicle body.

9. A constant force or near constant force suspension system as claimed in claim 1, further comprising filtering means to adjust said fictitious reference poion to thereby cause said fictitious reference point to track low frequency terrain disturbances.

10. A constant force or near constant force suspension system as claimed in claim 1, wherein said actuator comprises a hydraulic or pneumatic actuator.

11. A constant force or near constant force suspension system as claimed in claim 1, wherein said actuator comprises a linear or rotary electromechanical actuator.

12. A constant force or near constant force suspension system as claimed in claim 1, wherein said first sensing means comprises at least one accelerometer.

13. A constant force or near constant force suspension system as claimed in claim 12, wherein an output from said at least one accelerometer is integrated to yield said actual vertical position.

14. A constant force or near constant force suspension system as claimed in claim 1, wherein said first sensing means comprises a plurality of accelerometers.

15. A constant force or near constant force suspension system as claimed in claim 14, wherein outputs of said plurality of accelerometers are processed to determine pitch, roll, and vertical displacement of said vehicle body.

16. A constant force or near constant force suspension system as claimed in claim 3, wherein said at least one spring comprises a variable rate air spring.

17. A constant force or near constant force suspension system as claimed in claim 16, wherein said variable rate air spring controls roll of said vehicle body daring turning maneuvers.

18. A constant force or near constant force suspension system as claimed in claim 1, wherein said control signals develop modulated actuator torque.

19. A constant force or near constant force suspension system as claimed in claim 1, wherein said fictitious reference point is further determined by driver input.

20. A constant force or near constant force suspension system as claimed in claim 12, wherein data from said at least one accelerometer is filtered to correct for accelerometer drift.

21. A method for determining vertical position of a vehicle in motion having a near constant force suspension system, comprising:

obtaining vertical position data from at least one accelerometer;

obtaining drift data of said at least one accelerometer by spectrum analysis; and determining said vertical position from said vertical position data and said drift data.

22. A method for determining an updated vertical position of a vehicle in motion having a near constant force suspension system, comprising:

predicting anticipated vertical position data from measured road arm angular displacement, angular velocity, angular acceleration and measured characteristics of an actuator;

obtaining measured vertical position data from at least one accelerometer;

obtaining drift data of said at least one accelerometer;

determining a calculated vertical position from said measured vertical position data and said drift data; and comparing said anticipated vertical position data to said calculated vertical position data to identify errors in said anticipated vertical position data, thereby developing said updated vertical position of said vehicle.

23. The method of claim 22, wherein said measured characteristics comprise actuator voltage and current.

24. The method of claim 22, wherein said measured characteristics comprise actuator torque.

25. A method for providing near constant force suspension of a vehicle having a vehicle body and a vehicle wheel and at least one actuator connected between said vehicle body and said vehicle wheel, comprising:

tracking a fictitious reference point representative of a desired vertical position of said vehicle body;

determining displacement of said vehicle body relative to said fictitious reference point; and calculating a modulated torque or force of said at least one actuator using said displacement of said vehicle body, said modulated torque or force sufficient to move said vehicle body to be coincident to said fictitious reference point.

26. The method of claim 25, further comprising adjusting said fictitious reference point when said displacement of said vehicle body exceeds a preselected threshold of travel.

27. The method of claim 26, wherein said preselected threshold of travel comprises an upper and lower threshold of travel, thereby establishing a window of acceptable suspension travel.

28. The method of claim 27, wherein said window of acceptable suspension travel comprises between approximately 50% and 95% of suspension allowable travel.

* * * * *

UNITED STATES PATENT AND TRADEMARK OFFICE
CERTIFICATE OF CORRECTION

PATENT NO.    : 5,999,868
DATED         : December 7, 1999
INVENTOR(S)   : Joseph H. Beno; Damon A. Weeks; William F. Weldon; Don A. Bresie; Andreas M. Guenin It is certified that error appears in the above-identified patent and that said Letters Patent is hereby corrected as shown below:

In claim 23, column 15, line 39, delete "poion", and insert --point-- therefor.

In claim 17, column 15, line 66, delete "daring", and insert --during-- therefor.

Signed and Sealed this

Twenty-sixth Day of December, 2000

Attest:

Q. TODD DICKINSON

*Attesting Officer*   *Director of Patents and Trademarks*